United States Patent [19]

Turetsky

[11] 4,166,793

[45] Sep. 4, 1979

[54] FILTER-PURIFIER CARTRIDGE HAVING SEPARABLE ELEMENTS

[76] Inventor: Isadore Turetsky, 23940 Welby Way, Canoga Park, Calif. 91307

[21] Appl. No.: 934,421

[22] Filed: Aug. 17, 1978

[51] Int. Cl.² .................................................. B01D 27/00
[52] U.S. Cl. ..................................... 210/315; 210/450
[58] Field of Search ............... 210/295, 314, 315, 317, 210/338, 339, 458, 337, 450

[56] References Cited

U.S. PATENT DOCUMENTS

| | | | |
|---|---|---|---|
| 2,781,912 | 2/1957 | Newcum | 210/295 |
| 3,132,501 | 5/1964 | Jacobs et al. | 219/295 X |
| 3,262,570 | 7/1966 | Gallitis et al. | 210/315 X |
| 3,357,563 | 12/1967 | Sicard | 210/315 X |
| 3,487,940 | 1/1970 | Morris | 210/315 X |

*Primary Examiner*—William A. Cuchlinski, Jr.

[57] ABSTRACT

A filter-purifier cartridge arranged so that a self contained purifier element having an integral cartridge end closure at its lower end is inserted within the hollow core of a tubular filter element; the inlet and outlet passages of the purifier element arranged to permit axial flow through the hollow core containing the purifying medium of said purifier element, in combination with radial flow through the tubular filter; said cartridge being capable of manual assembly and separation.

9 Claims, 4 Drawing Figures

FILTER-PURIFIER CARTRIDGE HAVING SEPARABLE ELEMENTS

FIELD OF THE INVENTION

This invention relates to a filter and purifier cartridge, and since it finds particular utility in the field of water filtration and purification, embodiments thereof adapted for such use are hereinafter described as illustrative of the invention and the advantages thereof, it being understood that my invention is not restricted to such use.

There is a growing demand for an inexpensive filter element that can be periodically discarded, and a relatively economical purifying element which can be used in combination with said filter. Both the efficiency and filter life depend on the quantity of purifying material used, and the surface area of the filter. The difficulty arises from the fact that in present types of radial flow filter-purifier cartridges the fluid does not flow uniformly through the entire volume of the purifying medium, whereas in an axial flow filter-purifier cartridge the relatively small surface area used for filtration of the fluid decreases the life expectancy of the filter.

OBJECTS OF THE INVENTION

An object of my invention is to provide a filter-purifier cartridge for fluids having purifying and filtering elements which can be manually separated and assembled, and which can be removed when purifying or filtering efficiency is impaired, and replaced accordingly.

Another object of my invention is the provision for recharging the purifier element with new purifying medium resulting in a marked savings when compared to a throw-away unit.

Still another object of my invention is to combine the efficiency offered by a radial flow through the filter with an axial flow within the purifier element.

Embodiments of my invention capable of accomplishing the foregoing objects and providing the advantages contemplated by them and other advantages is described in the following specification which may be readily understood by reference to the accompanying drawings.

DETAILED DESCRIPTION OF THE DRAWINGS

Figure 1:
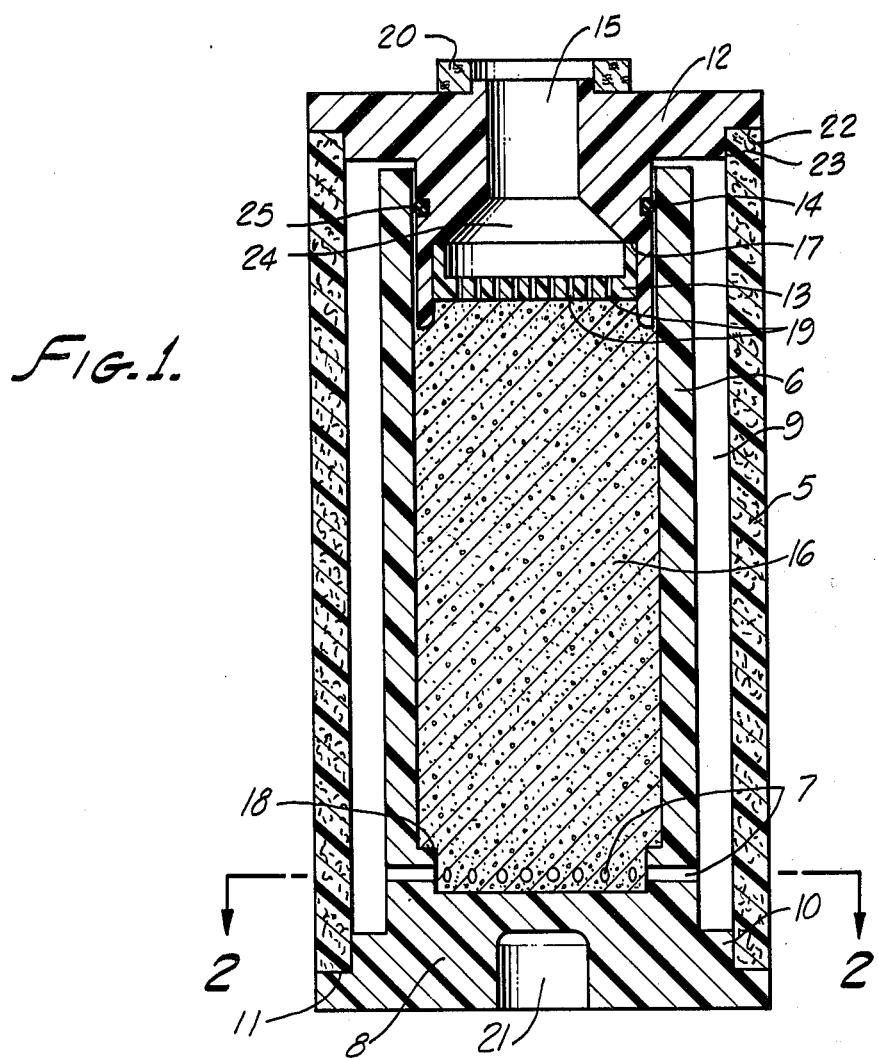
FIG. 1 is a side elevation sectional view of a filter-purifier cartridge of my invention.
Figure 2:
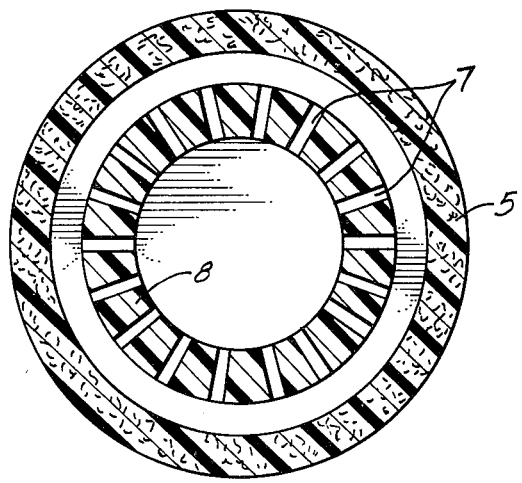
FIG. 2 is a horizontal cross-section of the filter-purifier cartridge of FIG. 1 taken along the line 2—2.

Referring to FIG. 1 which is for illustrative purposes only, the numeral 5 indicates a permeable porous tubular filter element having a hollow core. The hollow cylinder 6 of the purifier element having an integral cartridge end closure 8 at its lower end and containing the purifying medium 16 is inserted into the hollow core of the tubular filter 5 so that one end of said tubular filter rests against and is sealed by the shoulder 11 of the larger stepped diameter of said cartridge end closure 8. The sidewall of the tubular filter 5 is spaced from the hollow cylinder 6 by means of the smaller stepped diameter 10 of the cartridge end closure 8 forming the annular channel 9, said stepped diameter 10 being inserted into the hollow core of the tubular filter 5. The annular space 9 communicates with the hollow core of cylinder 6 by means of passages 7 circumferentially disposed in the lower end section wall of cylinder 6. The manually separable top end member 12 has a concentric passage 15 which extends axially through said top member 12, said passage communicates with the hollow core of cylinder 6 via collector chamber 24, and is the discharge port of the filter-purifier cartridge. An "O" ring seal 14 within a retaining groove 25 in the top end member 12 prevents leakage of unprocessed fluid between said end member 12 and the hollow cylinder 6. A perforated cup 13 is inserted into the internal recess of the top end member 12. The perforated cup 13 being a sliding fit in the internally recessed section of the top end member 12 rests against the internal shoulder 17 of said internally recessed section and is retained in said recessed section. A ring gasket 20 is positioned atop the end member 12 and around the exit port 15 of the filter-purifier cartridge. An internal shoulder 18 within the lower end section of the hollow cylinder 6 and located above the passages 7 can be used to support an optional perforated cup or disk which is not shown. The top end member 12 is inserted into the core of cylinder 6 until the remaining exposed end of the tubular filter element rests against the shoulder 22 of the larger stepped diameter of said top end member 12; the smaller stepped diameter 23 of said end member being inserted into the hollow core of said tubular filter to maintain the spaced relationship of the tubular filter with the hollow cylinder 6. The circular recess 21 in the cartridge end closure 8 can be used to center the cartridge within its housing.

In operation the filter-purifier cartridge as shown is subjected to axial compression after the cartridge is inserted in its housing. The cartridge housing is not part of my invention and is not illustrated. It will be evident that, while the filter housing is not shown, one skilled in the art can easily adapt the illustrated cartridge to a hollow cylindrical housing having axially aligned inlet and outlet passages. One skilled in the art will also note that embodiments of the cartridge as shown are adapted to a common type of filter housing which is screwed onto a double ported end section containing a "O" ring to seal the single open end of said housing. In addition, the manually separable top end member can be joined to the hollow cylinder 6 by threaded means, and can be designed as a socket or cap type rather than a plug type member.

With the filter-purifier cartridge assembled as illustrated, fluid to be filtered and purified flows radially through the permeable porous tubular filter 5 and enters the annular space 9. The fluid then enters the hollow core of cylinder 6 through the passages 7, and flows axially through the hollow core of cylinder 6 containing the purifying medium 16, and enters the collector chamber 24 through perforations 19 of cup 13. The fluid then exits through the discharge port 15, said discharge port communicating with the discharge passage of the cartridge housing. The gasket 20 surrounding the cartridge discharge port 15 and the cartridge housing discharge passage prevents unprocessed water from being discharged through said cartridge housing discharge passage.

Figure 3:
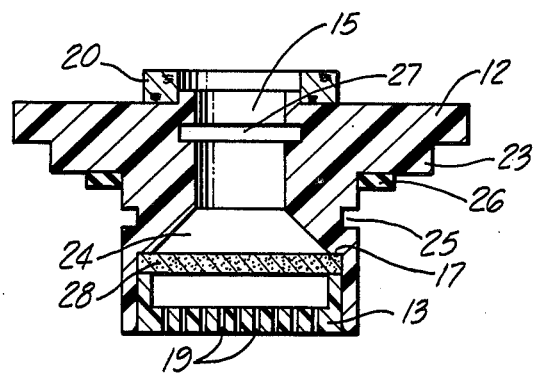
FIG. 3 is a side elevation sectional view of a modified top end member for the filter-purifier cartridge of FIG. 1.

The top end member shown is FIG. 3 is generally like that of FIG. 1 but has an internal "O" ring retainer groove 27 encircling the discharge passage 15. A resilient gasket 26 rests against the shoulder of the smaller stepped diameter 23. In addition, a permeable porous disk 28 is inserted into the internally recessed section of the top end member 12, and is disposed between the perforated cup 13 and the collector chamber 24; said permeable porous disk 28 resting against the internal shoulder 17.

Figure 4:
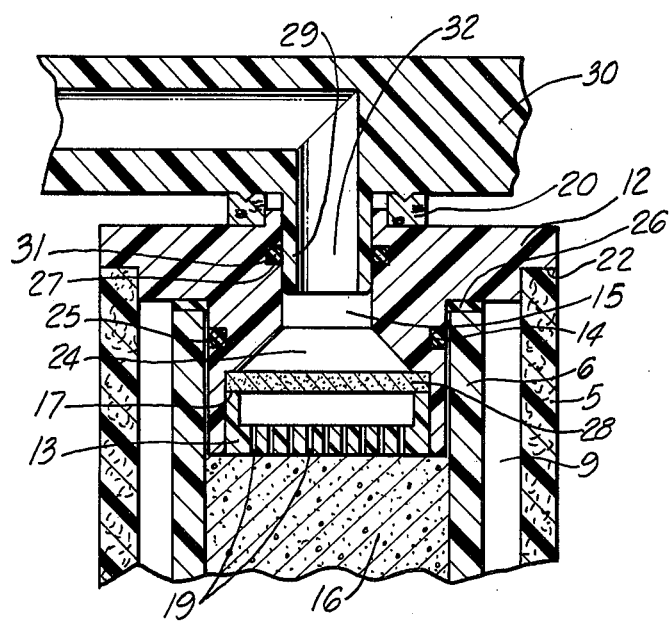
FIG. 4 is a partial side elevation sectional view illustrating the top end member of FIG. 3 bearing against the upper end member of one type of cartridge housing.

FIG. 4 shows the top end member of FIG. 3 with "O" ring seal 31 in retainer groove 27 and "O" ring seal 14 in retainer groove 25; said top end member bearing against the ported end section 30 of one type of cartridge housing having a protruding hollow tubular extension 29, the hollow core 32 of said tubular extension 29 being the discharge passage of the cartridge housing. The tubular extension 29 is inserted into the cartridge discharge port 15 so that the "O" ring 31 encircles said tubular extension. Unprocessed fluid is prevented from entering the cartridge discharge port 15 and the cartridge housing discharge passage 32 by means of a double seal; the "O" ring seal 31 and the ring gasket 20.

The resilient gasket 26 rests against the upper end wall of hollow cylinder 6 and is subjected to compression, said gasket 26 serving to transmit compressive stress through the wall of hollow cylinder 6 to the top end member 12, and to prevent unprocessed fluid from entering the upper end section in the hollow cylinder 6. The "O" ring seal 14 also serves to prohibit unprocessed fluid from entering the upper end section in hollow cylinder 6.

The permeable porous disk 28 serves to confine particles that may escape through perforations 19 in cup 13.

The present invention contemplates alternate embodiments which can include a fiber winding on a reticulated or perforated core as a tubular filter element. A pleated resin impregnated filter paper formed around a perforated core, or formed around the cylindrical purifier element having modified end sections to contain said pleated filter paper can be used as a tubular filter element. Also, a removable permeable sheath can be wound around the pervious tubular filter element.

While the embodiments of this invention hereinbefore illustrated and described are fully capable of performing the objects and accomplishing the advantages primarily stated, it will be understood that this invention is not restricted to the specific embodiments hereinbefore set forth, but includes all modifications coming within the scope of the claims that follow.

I claim:

1. A filter-purifier cartridge for liquids adapted to be inserted in a filter apparatus, comprising: a tubular purifier element containing purifying medium within its hollow core and having an integral cartridge end closure at its bottom end, and circumferentially disposed passages through the wall of the lower end section of said purifier element; said tubular purifier element inserted into the hollow core of a tubular filter, one end of said tubular filter being sealed and spaced from the sidewall of the purifier element by means of said cartridge end closure to form an annular space which communicates with the hollow core of the purifier element by means of said circumferentially disposed passages; a manually separable top end member being joined to the upper end section of the tubular purifier element maintains the spaced relationship of the tubular filter with the sidewall of said purifier element, the adjacent end of the tubular filter and said annular space being sealed by said top end member; a concentric discharge passage through said top end member communicates with the hollow core of said tubular purifier element, said separable top end member retaining a foraminous member disposed above the purifying medium within the hollow core of said purifier element.

2. The invention defined in claim 1, in which a frictional seal is disposed between the top end member and the tubular purifier element.

3. The invention defined in claim 1, in which a frictional seal surrounds the discharge passage of said top end member.

4. The invention defined in claim 1, wherein a chamber exists between the foraminous member and said discharge passage in the top end member.

5. A filter-purifier cartridge for liquids adapted to be inserted in a filter apparatus, comprising: a tubular purifier element containing purifying medium within its hollow core and having an integral cartridge end closure at bottom end, and circumferentially disposed passages through the wall of the lower end section of said purifier element, said tubular purifier element inserted into the hollow core of a tubular filter, one end of said tubular filter being sealed and spaced from the sidewall of the purifier element by means of said cartridge end closure to form an annular space which communicates with the hollow core of the purifier element by means of said circumferentially disposed passages; a manually separable top end member being joined to the upper end section of the tubular purifier element maintains the spaced relationship of the tubular filter with the tubular filter and the sidewall of said purifier element, the adjacent end of the tubular filter and said annular space being sealed by said top end member; a concentric discharge passage through said top end member communicating with the hollow core of said tubular purifier element; a frictional seal disposed atop said top end member and surrounding said discharge passage; a second frictional seal retained within the top end member and encircling the discharge passage; said manually separable top end member retaining a foraminous member disposed above the purifying medium within the hollow core of said purifier element.

6. The invention defined in claim 5 wherein a frictional seal is disposed between the sidewall of the top end member and the sidewall of the tubular purifier element; a second frictional seal being disposed between said top wall member and the end wall of said tubular purifier element.

7. The invention defined in claim 5 wherein a chamber exists between the foraminous member and said discharge passage of the top end member.

8. The invention defined in claim 7 wherein a permeable porous disk is disposed intermediate said chamber and said foraminous member, said permeable porous disk being spaced from the foraminations of said foraminous member.

9. The invention defined in claim 5 in which the top end member is manually affixed to the upper end section of said tubular purifier element.

* * * * *